Figure 1:
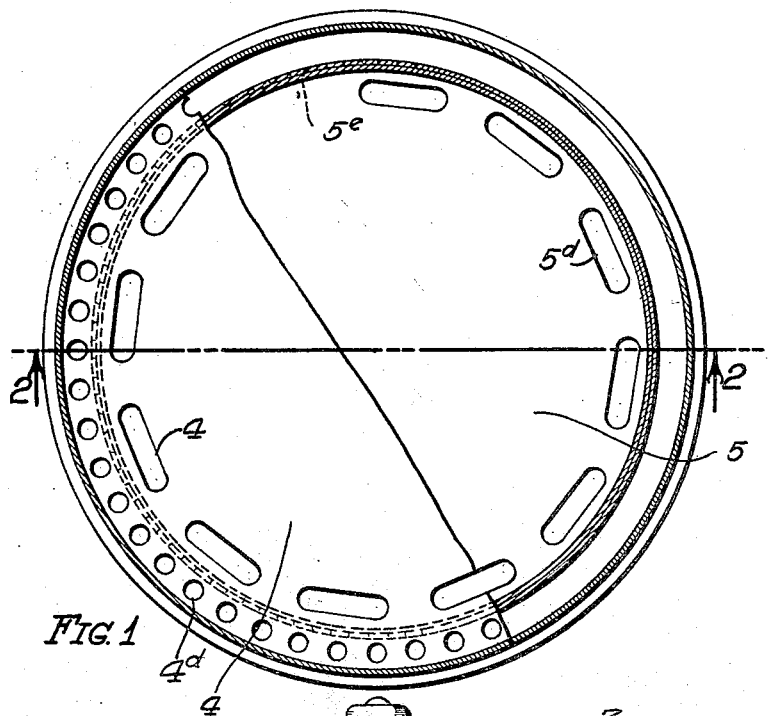

Dec. 11, 1928.  1,694,773
W. R. DICK
INTERNAL HEAT CIRCULATING COOKING UTENSIL
Filed Jan. 3, 1927  4 Sheets-Sheet 1

INVENTOR.
WILLIAM R. DICK
BY A. B. Bowman
ATTORNEY

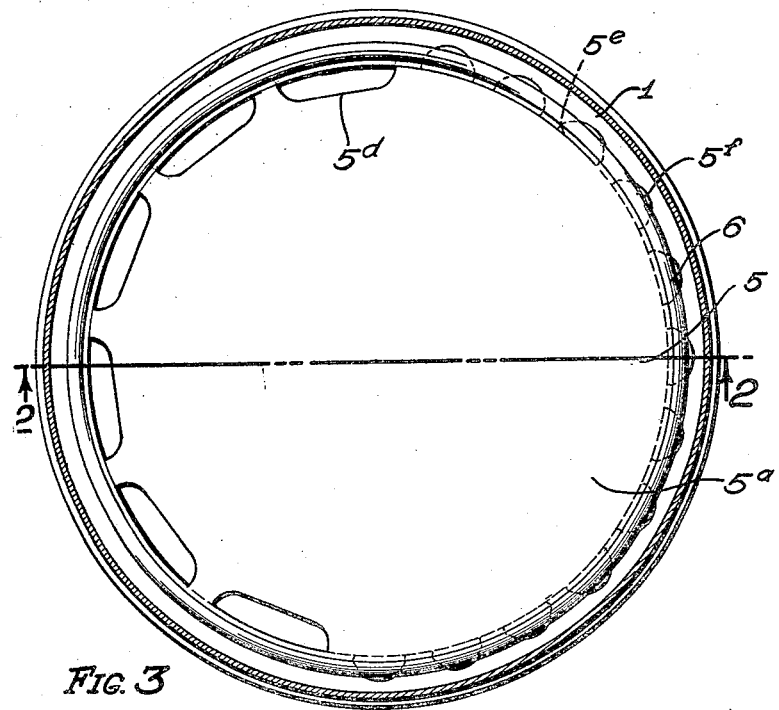
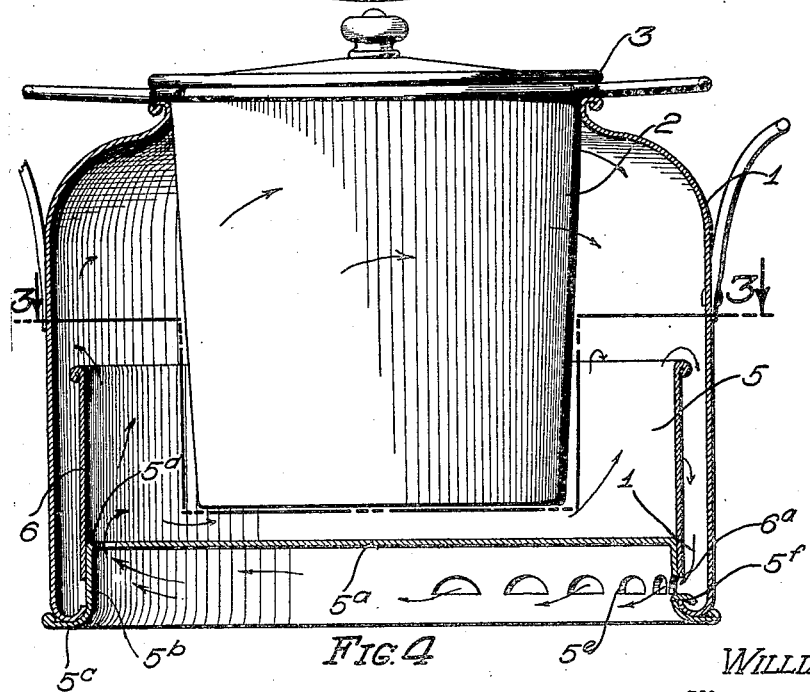

Dec. 11, 1928.

W. R. DICK

INTERNAL HEAT CIRCULATING COOKING UTENSIL

Filed Jan. 3, 1927   4 Sheets-Sheet 3

1,694,773

INVENTOR.
WILLIAM R. DICK
BY A. B. Bowman
ATTORNEY

Dec. 11, 1928.                                                    1,694,773
W. R. DICK
INTERNAL HEAT CIRCULATING COOKING UTENSIL
Filed Jan. 3, 1927               4 Sheets-Sheet 4
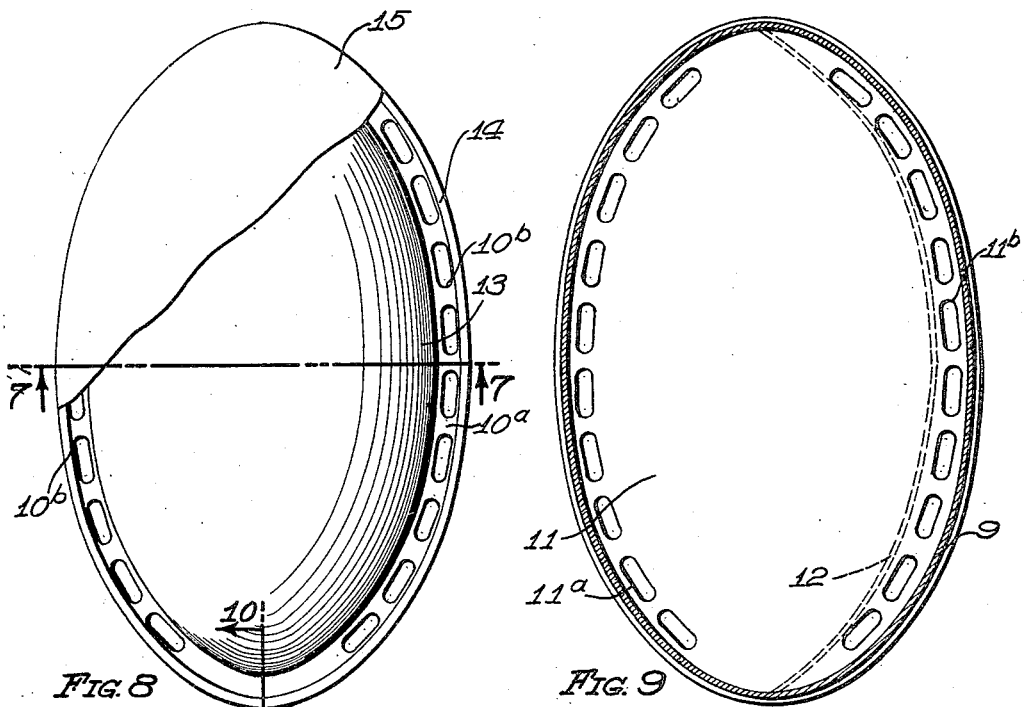
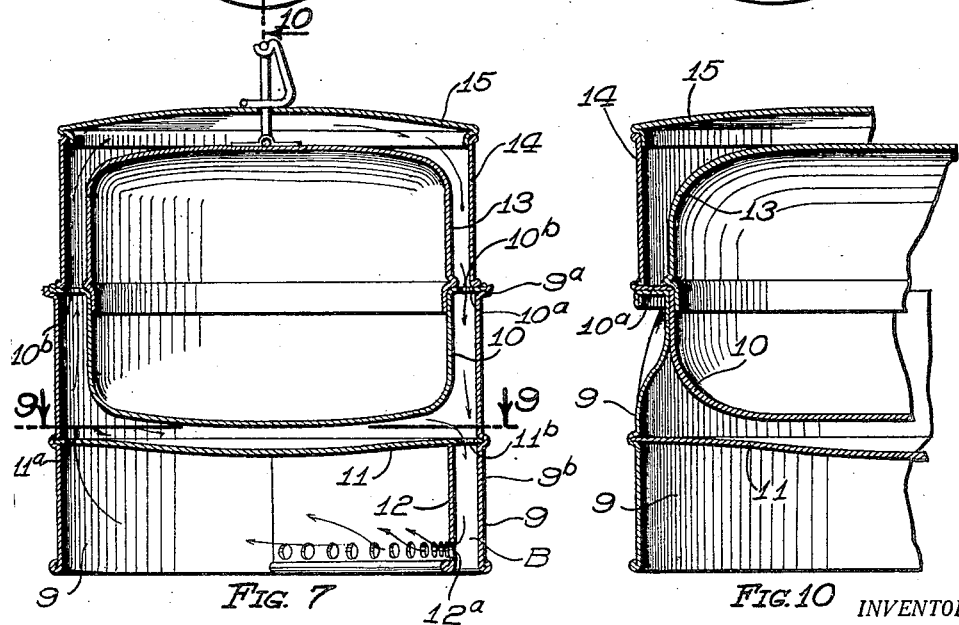
INVENTOR.
WILLIAM R. DICK
BY A. B. Bowman
ATTORNEY Patented Dec. 11, 1928.

1,694,773

UNITED STATES PATENT OFFICE.

WILLIAM R. DICK, OF SAN DIEGO, CALIFORNIA.

INTERNAL-HEAT-CIRCULATING COOKING UTENSIL.

Application filed January 3, 1927. Serial No. 158,564.

My invention relates to cooking utensils, and the objects of my invention are: first, to provide a cooking utensil having means for internal circulation whereby the air, or gases, originally heated by the heating means over which the utensil is positioned, is circulated through the utensil and, after being slightly cooled, is returned to the heating means to be reheated for further circulation through the utensil, thereby providing high efficiency in heating as well as great economy in fuel consumption; second, to provide a utensil of this class which requires little or no auxiliary ventilating means for the admission of fresh air or the discharge of spent air or gases; third, to produce a utensil of this class which provides continuous circulation of hot air, or gases, around the receptacle to be heated; fourth, to provide a receptacle of this class in which scorching of food, or other products, in the inner or outer receptacle is reduced to a minimum; fifth, to provide a utensil of this class whereby substantially the whole of the inner cooking receptacle is subjected to the effect of circulating hot air, or gases, thus uniformly heating the same at the bottom as well as at the side walls thereof; sixth, to provide a utensil of this class whereby hot air or gas is permitted to impinge against the outer walls of the cooking receptacle and to circulate around the same, said air or gas, upon being cooled by contacting with the walls of the inner and outer receptacles, being directed downwardly against the side wall of the latter and directed to the lower central portion thereof to be reheated for recirculation; and seventh, to provide a novelly constructed internal circulating cooking utensil and one which is simple, economical and light of construction proportionate to its functions, durable, and which will not readily deteriorate or get out of order.

Figure 2:
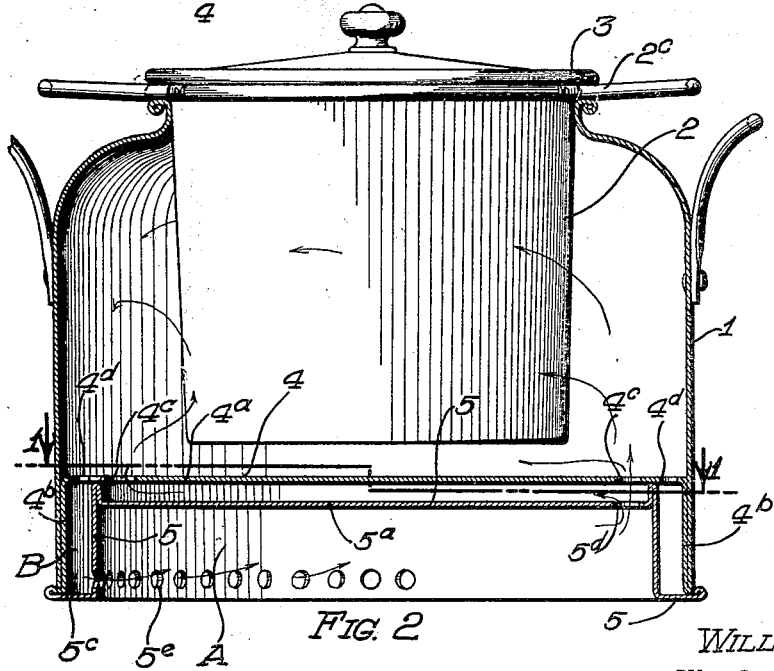
Figure 5:
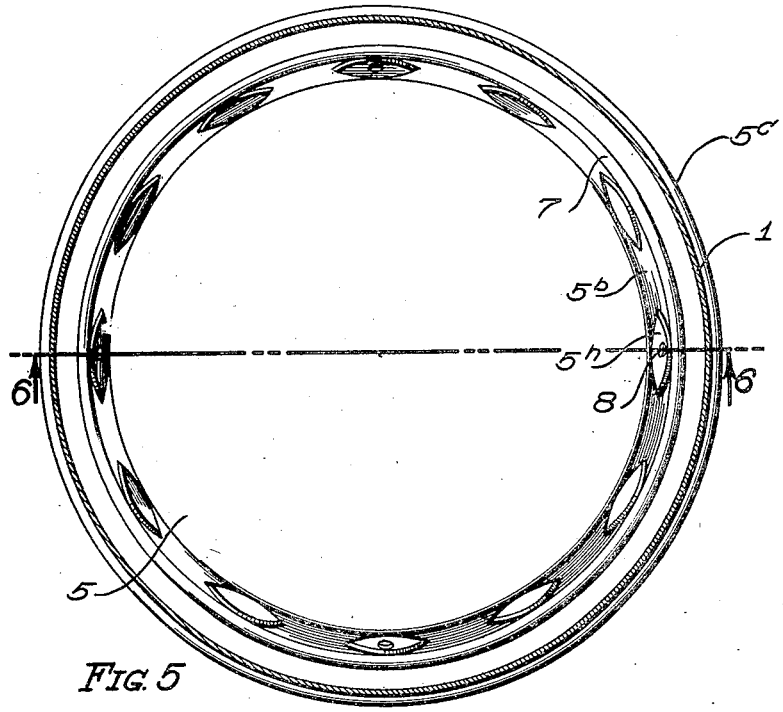
Figure 6:
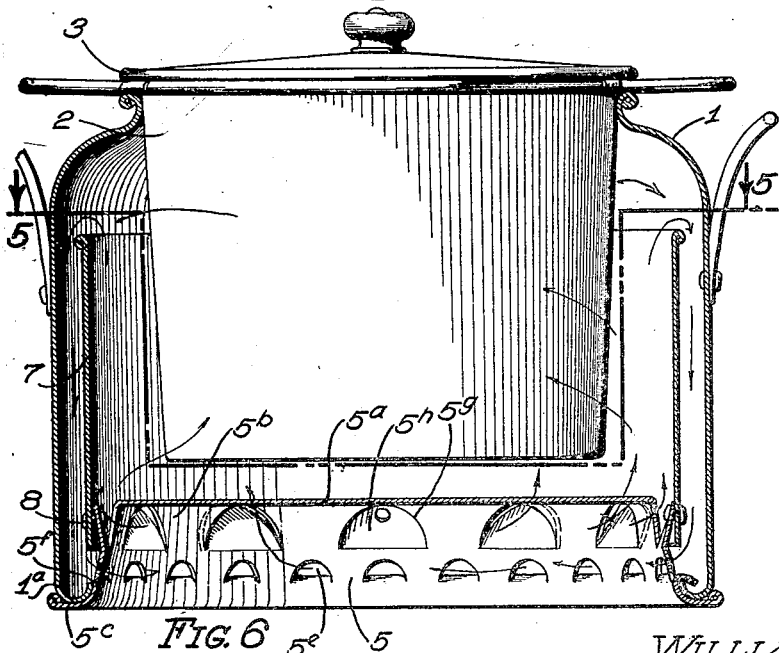

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a sectional view in plan of my cooking utensil in one form of construction, the section being taken through 1—1 of Fig. 2; Fig. 2 is a sectional elevational view thereof, taken through 2—2 of Fig. 1; Fig. 3 is a sectional view in plan of a slightly modified form of construction, incorporating my invention, the section being taken through 3—3 of Fig. 4; Fig. 4 is a sectional elevational view thereof, taken through 4—4 of Fig. 3; Fig. 5 is a sectional view in plan of another slightly modified form of construction of my invention with the section taken through 5—5 of Fig. 6; Fig. 6 is a sectional elevational view thereof, taken through 6—6 of Fig. 5; Fig. 7 is a sectional elevational view of a roaster, incorporating my present invention, the section being taken through 7—7 of Fig. 8; Fig. 8 is a top view of the roaster with the cover and extension member partially broken away to facilitate the illustration; Fig. 9 is a sectional view thereof in plan, taken through 9—9 of Fig. 7; and Fig. 10 is a fragmentary sectional elevational view thereof, taken through 10—10 of Fig. 8.

Like characters of reference refer to similar parts and portions throughout the several views of the drawings.

The utensils shown in Figs. 1 to 6, inclusive, consist essentially of outer heat directing receptacles 1, inner cooking receptacles 2, and covers 3. The outer receptacles are considerably larger than the cooking receptacles contained therein, and are abruptly constricted at their upper or neck ends. The cooking receptacles 2 are provided at their upper ends with rolled ledges $2^a$ for supporting the receptacles 2 on the upper edges of the constricted portions of the lower or outer receptacles. Over the upper open ends of the cooking receptacle 2 are positioned covers 3, which form units with the receptacles 2.

In the structure shown in Figs. 1 and 2 of the drawings, the bottom, designated 4, of the outer receptacle 1, is formed by turning the bottom portion of the receptacle 1 inwardly, or upwardly, providing a bottom plate portion $4^a$ positioned above the lower edge of the receptacle and extending to the outer side walls thereof. The portions $4^b$ of the bottom 4 connect the peripheral portion of the plate $4^a$ with the bottom edge of the outer receptacle 1 and provide a double wall at said lower portion. In the space below the plate $4^a$ is positioned the bottom member 5, which is shaped substantially as an inverted dish and consists of a bottom plate portion $5^a$, an annular band portion $5^b$ extending around and upwardly and downwardly from the plate portion $5^a$, and an annular flange $5^c$ extending radially from the lower edge of the band $5^b$ to underneath and beyond the lower edge of the outer receptacle. The outer portion of the flange $5^c$ is secured to the lower edge of the side wall of the receptacle 1 in any suitable manner, and supports the bottom member 5 below the plate portion $4^a$. The bottom or plate portion $5^a$ of the bottom member 5 is spaced below the upper edge of the band or side wall member $5^b$ and is also spaced from the plate $4^a$, as shown.

Near the peripheral edge of the plate portion $5^a$ are provided a plurality of ports $5^d$, which permit hot air, or gases of combustion, to flow from the interior of the bottom member into the space between the plate portions $4^a$ and $5^a$. The plate portion $4^a$ is provided with a plurality of ports $4^c$, preferably around its circumference, which permits the flow of hot air, or gases of combustion, into the interior of the receptacle 1 around the sides and bottom of the cooking receptacle 2. The ports $4^c$ are positioned inwardly from the upper edges of the band portions, or side walls, of the bottom member 5, which portions $5^b$ extend to the under side of the plate portion $4^a$ and divide the space below the plate portion $4^a$ into an inner compartment A and an outer compartment B. In the plate portion $4^a$ are provided other ports $4^d$, which are positioned outwardly from the ports $4^c$ and connect the interior of the outer receptacle with the outer compartment B of the space below the plate portion $4^a$. At the lower portions of the side walls $5^b$ of the bottom member 5 are provided ports $5^e$, which connect the outer compartment B with the inner compartment A, and therefore permit the flow of cooled air, or gases of combustion, downwardly alongside the outer wall of the outer receptacle 1 into the compartment A, which is positioned directly over the burner or other heating means.

It will be noted that the ports $5^d$ in the plate portion $5^a$ are preferably positioned at one side only of said plate portion, while the ports $5^e$ are preferably positioned only at the opposite side of the bottom member so as to provide for circulation of air or gases upwardly from one side of the compartment A, a general circulation of the hot gases from one side to the other within the interior of the receptacle 1, and a general return of the cooled gases from one side of the receptacle 1 to one side of the bottom member over the heating means.

It will be noted that if a gas or fuel oil burner is used, the structure may be slightly modified by providing small discharge ports at the upper portion of the receptacle 1, or at the lower portion thereof, either above or below the bottom plate portion $4^a$.

In the modified structure shown in Figs. 3 and 4, the bottom edge of the outer receptacle 1 is turned upwardly a considerable distance and may extend approximately halfway therein. This inwardly turned portion, designated 6, is spaced from the outer wall of the receptacle 1 and forms a partition wall for forcing the hot air or gases upwardly alongside the outer side of the inner receptacle 2 until the air or gases is permitted to engage the outer wall of the receptacle 1 and to be directed downwardly along the outer side of the wall 6. The bottom of the receptacle 1 is also provided with a bottom member 5 having a plate portion $5^a$, a side wall portion $5^b$, and a flange portion $5^c$. The plate portion $5^a$ in this modification, however, extends to the wall 6 and is provided at the peripheral portion thereof, at one side of the plate portion, with ports $5^d$, which connect the space below the plate portion $5^a$ with the interior of the receptacle 1 and permit the hot air and gases to flow around the cooking receptacle 2. Near the lower portion of the wall 6, preferably at one side only of said wall, are provided a plurality of ports $6^a$, which are coincident with correspondingly shaped ports $5^e$ in the side wall portion $5^b$ of the bottom member 5. The ports $5^e$ are formed by bending outwardly portions $5^f$ through the ports $6^a$, the portions $5^f$ being utilized for securing the bottom member 5 to the receptacle 1 and the inwardly directed wall thereof.

The modification, shown in Figs. 3 and 4, it will be noted, also provides for an introduction of the hot air, or gases, from one side of the interior of the receptacle 1, a general direction of the air, or gases, around the side walls and bottom of the cooking receptacle 2 toward the opposite side of the utensil, and thence over the wall 6, downwardly along the side wall of the receptacle 1, and back to the interior of the bottom member, where it is reheated.

The modified structure, shown in Figs. 5 and 6, is also provided with an inner baffle wall, designated 7, which is spaced from the outer wall of the outer receptacle 1, and extends near the upper portion thereof. The wall 7 in this modified structure, however, is an annular member separate from the receptacle 1 and is supported at its lower end on the bottom member 5, which is also of inverted dish-shape and secured, by means of outwardly bent portions $5^f$ of the bottom member 5, to an inwardly and upwardly rolled edge $1^a$ at the lower end of the side wall of the outer receptacle 1, as shown in Fig. 6. The outwardly bent portions $5^f$, in this modified structure, also form ports $5^e$ at the lower portion of the bottom member, as described in connection with the structure shown in Figs. 3 and 4. The upper portions of the side wall 5ᵇ of the bottom member are provided with large, upwardly directed ports 5ᵍ, which are formed by bending portions, designated 5ʰ, outwardly. To the lugs 5ʰ is secured, by means of rivets 8, the lower end of the annual wall 7.

In the latter modification, the hot air, or gases of combustion, passes upwardly through the ports 5ᵍ, around the bottom and side walls of the inner or cooking receptacle 2, upwardly above the upper edge of the baffle wall 7, and thence downwardly between said baffle wall and the outer wall of the outer receptacle, through the ports 5ᵉ, and into the interior of the bottom member for reheating the air or gases.

The outer or heat confining receptacle of the roaster, shown in Figs. 7 to 10, inclusive, consists of an upright wall, designated 9, of elliptical shape. At the upper edge of the member 9 is provided a positioning and supporting ledge 9ᵃ for supporting the peripheral edge of a wide, outwardly extending flange 10ᵃ at the upper edge of the roasting pan 10, which is supported at the upper portion of the outer receptacle or member 9. The upper and lower portions of the receptacle 9 are separated by a bottom plate 11, which is secured at its peripheral edge on the member 9 in any suitable manner. The lower compartment of the supporting receptacle 9 is again divided by a wall member 12, which extends, preferably, from one end of the receptacle 9 to the other, and is preferably positioned contiguous to the wall at the lateral side of the supporting receptacle 9, as shown in Figs. 7 and 9, providing an outer compartment B. The roasting pan 10 is provided with a relatively deep cover 13, which is covered by an extension member 14 and by a secondary member 15, the former being spaced from the side walls of the cover 13 and supported at its lower edge at the outer portion of the flange 10ᵃ, and the latter resting on the upper edge of the extension member 14.

At the opposite sides and near the peripheral edge of the bottom plate 11, are provided ports 11ᵃ and 11ᵇ, respectively, the former of which connects the large, or central, compartment below the plate 11 with the compartment above said plate, while the latter ports connect the compartment above said plate with the narrow, arcuate compartment B. The lower portion of the wall 12 is provided with ports 12ᵃ, which connect the compartment B with the main, or central, compartment below the plate 11. The supporting flange 10ᵃ of the roasting pan 10 is provided with ports 10ᵇ, which connect the space around the pan 10 with the space around the cover 13. Thus, the hot air or gas from the main compartment below the plate 11 is directed to one side and upwardly through the ports 11ᵃ, from which it is directed to the bottom and side walls of the pan 10. Said air or gas is then directed through the ports 10ᵇ, above the ports 11ᵃ, to the sides and over the top portion of the cover 13, and is then directed downwardly through the ports 10ᵇ at the opposite side of the roaster, and thence downwardly through the ports 11ᵇ and the ports 12ᵃ to the central compartment of the supporting receptacle 9, where the air or gas is reheated.

Though I have shown and described a particular construction, combination and arrangement of parts and portions and certain modifications thereof, I do not wish to be limited to this particular construction, combination and arrangement nor to the modifications, but desire to include in the scope of my invention, the construction, combination and arrangement substantially as set forth in the appended claims.

Having thus described my invention, what I claim as new and desire to secure by Letters Patent is:

1. In a utensil of the class described, a receptacle having a raised bottom means adapted to receive heat from a heating means and provided with ports at its upper portion communicating upwardly with the open interior portion of said receptacle adapted to permit the flow of hot gases from the lower to the upper side of said receptacle, and said bottom means also provided with other ports adapted to permit the return of gases from its upper side to its lower side at the lateral portions of the bottom means.

2. In a utensil of the class described, a receptacle having a bottom means extending above the bottom portion of the receptacle and spaced from its side wall, said bottom means having ports in its upper portion communicating with the open interior portion of said receptacle to permit the flow of hot gases from its interior to the top side thereof, and said bottom means also provided with other ports at its lower portion to permit the return of gases to its interior.

3. A receptacle of the class described, having a raised bottom provided with open passages adapted to permit the flow of hot gases from the under side of the receptacle to the open interior portion thereof above said raised bottom, and from the interior to the lower inside portion thereof.

4. A receptacle, having a bottom raised above the bottom edge of the receptacle and spaced inwardly from its side wall, the upper portion of the bottom having open ports adapted to permit the flow of hot gases from the interior of said raised bottom into the open interior portion of the receptacle, the lower portions of the side walls of said raised bottom being also provided with ports adapted to permit gases, cooled against the side wall of the receptacle, to return to the interior or exterior of the bottom.

5. In a utensil of the class described, a receptacle having a bottom plate portion positioned above its lower edge, and a bottom member positioned in said receptacle below said bottom plate portion, dividing the space within the side wall of the receptacle into an inner and an outer compartment, said outer compartment communicating with the space above said plate portion, said plate portion being provided with ports near its peripheral edge permitting the flow of hot gases from the inner compartment to the space above the bottom plate portion, and said bottom member being provided with other ports at its lower portion permitting communication between the inner and outer compartments.

6. In a utensil of the class described, a receptacle having a bottom plate portion positioned above its lower edge and extending to the side walls of the receptacle, and a bottom member positioned within the receptacle below said plate portion and spaced with its side wall from the side wall of the receptacle dividing the space below the plate portion into an inner and an outer compartment, said plate portion being provided with ports at a portion inwardly from the side wall of the bottom member to permit communication of the inner compartment with the space above said plate portion, said plate portion being also provided with ports connecting the space above said plate portion with the outer compartment, the lower portion of the side wall of said bottom member being provided with ports connecting said inner and outer compartments.

7. In a utensil of the class described, a receptacle having a bottom plate portion positioned above its lower edge and extending to the side walls of the receptacle, and a bottom member positioned within the receptacle below said plate portion and spaced with its side wall from the side wall of the receptable dividing the space below the plate portion into an inner and an outer compartment, said plate portion being provided with ports at a portion inwardly from the side wall of the bottom member to permit communication of the inner compartment with the space above said plate portion, said plate portion being also provided with ports connecting the space above said plate portion with the outer compartment.

8. In a utensil of the class described, a receptacle, a plate positioned therein and spaced upwardly from its bottom portion, and a side wall member extending downwardly from said plate and spaced inwardly from the side wall of the receptacle, said plate being provided with ports positioned inwardly from said side wall member permitting communication from the under side to the upper side of said plate, the upper side of said plate communicating also with the space below the same through passages at the peripheral portion of said plate and at the bottom portion of said side wall member.

9. In a utensil of the class described, a receptacle, a plate positioned therein and spaced upwardly from its bottom portion, and a side wall member extending downwardly from said plate and spaced inwardly from the side wall of the receptacle, said plate being provided with ports near its peripheral edge and at one side only permitting communication from the space within the side wall member with the space above the plate, the space above said plate communicating with a compartment within the side wall member, also through passages at the lower portion of said side wall member and at the side thereof opposite the ports.

10. In a utensil of the class described, a receptacle having a raised bottom, and a bottom member secured to said receptacle and provided with a bottom plate spaced below the raised bottom and provided with a side wall spaced inwardly from the outer side wall of the receptacle, said bottom plate being provided with ports near its peripheral portion and said raised bottom being provided with ports positioned inwardly from the side wall of said bottom member, said last mentioned ports connecting the space below the bottom plate of said bottom member through the ports therein with the space above the raised bottom, said raised bottom being also provided with other ports at its periphery adapted to connect the space above said raised bottom with the space between the side walls of said receptacle and said bottom member, the side wall of said bottom member being also provided with ports connecting the space outside of said side wall with the space below the bottom plate of the bottom member.

11. In a utensil of the class described, a receptacle having a raised bottom, and a bottom member secured to said receptacle and provided with a bottom plate spaced below the raised bottom and provided with a side wall spaced inwardly from the outer side wall of the receptacle, the bottom plate of said bottom member being provided near its peripheral portion and at one side only with ports, said raised bottom being also provided with ports positioned inwardly from the side walls of said bottom member and adapted to connect the space below said bottom plate through the ports therein with the space above said raised bottom, said raised bottom being provided with other ports connecting the space thereabove with the space between the side walls of the receptacle and the bottom member, the side wall of the bottom member being also provided with ports near its lower end and at the side thereof opposite the ports in said bottom plate for connecting the space between the side walls of the receptacle and the bottom member with the space below the bottom plate of the bottom member.

12. In a utensil of the class described, a supporting receptacle having a supporting ledge at its upper end, and a cooking receptacle positioned therein and supported at its upper end on said ledge, said supporting receptacle having a raised bottom provided with passages at its upper side adapted to permit the flow of hot gases from the under side of the receptacle to the open interior thereof and other ports for the return of partially cooled gases from the interior to the under side thereof.

13. In a utensil of the class described, a supporting receptacle having a supporting ledge at its upper end, and a cooking receptacle positioned therein and supported at its upper end on said ledge, said supporting receptacle having a bottom raised above the bottom edge thereof and spaced inwardly from its side wall, the upper portion of the bottom having ports adapted to permit the flow of hot gases from the interior of said raised bottom into the interior of the receptacle, the lower portions of the side walls of said raised bottom being provided with ports adapted to permit gases, cooled against the side wall of the receptacle, to return to the interior of the bottom.

In testimony whereof, I have hereunto set my hand at San Diego, California, this 22nd day of December 1926.

WILLIAM R. DICK.